March 14, 1961 G. A. MORTON 2,975,283
INFRA-RED SIGNALLING AND DETECTING SYSTEMS
Filed Dec. 5, 1950

INVENTOR
George A. Morton
BY J. L. Whittaker
ATTORNEY

United States Patent Office 2,975,283

Patented Mar. 14, 1961

2,975,283

INFRA-RED SIGNALLING AND DETECTING SYSTEMS

George A. Morton, Princeton, N.J., assignor to Radio Corporation of America, a corporation of Delaware Filed Dec. 5, 1950, Ser. No. 199,319

11 Claims. (Cl. 250—83.3)

This invention relates generally to wave signalling and detecting systems, and more particularly to systems for detecting infra-red radiation when components of the earth's atmosphere emit random bands of infra-red radiation which mask the desired signal intelligence and reduce the sensitivity of such detectors.

Any object above absolute zero emits infra-red radiation. A fairly warm body, such as an airplane, emits large amounts of this radiation which can be detected over relatively long distances by suitable infra-red detectors, either in the form of bolometers or photo-conductors. The atmosphere, however, is substantially opaque to some infra-red energy, and transmits only narrow bands of infra-red energy at certain wavelengths. Some of the absorption by the atmosphere of infra-red (opaqueness to infra-red transmission) is caused by the presence of water vapor and carbon-dioxide in the air. The water vapor and carbon-dioxide not only absorb some infra-red energy spectra but also emit background radiation (having random amplitude, random frequency, and random phase) which tends to mask the desired signal energy. The reduction of the desired radiated signal and the masking of this signal by statistical background radiation limits the magnitude of the minimum signal to be detected, thereby substantially reducing the sensitivity of the detector.

An object of the instant invention is to provide improved systems for detecting infra-red radiation.

Another object of this invention is to provide an improved filtering system for rejecting ambient background radiation in an infra-red detecting system.

A further object of the invention is to provide a housing unit for the filter components having supporting members substantially permeable to infra-red radiation.

A still further object is to minimize infra-red ambient radiation from filter elements in an infra-red detecting system.

The ultimate sensitivity of infra-red detectors is increased, in the present invention, by eliminating undesirable background radiation with a suitable filter. Since water vapor and carbon-dioxide, existing in the atmosphere at relatively warm temperatures, emit ambient infra-red energy masking the desired signal, identical filter components (i.e. water and carbon-dioxide) maintained at reduced temperatures are used to filter out the ambient radiation. The amount of infra-red energy radiated from identical bodies varies as the fourth power of their absolute temperatures, for example, $$\left[\frac{R_1}{R_2}=\left(\frac{T_1 \text{ absolute}}{T_2 \text{ absolute}}\right)^4\right]$$

The maintenance of water and carbon-dioxide in substantially transparent, frozen form (−40° C. or lower) enables these components to absorb the undesirable ambient radiation originating because of like components in the earth's atmosphere.

Temperatures of −40° C. or lower may be maintained by passing a stream of air to be cooled over frozen carbon-dioxide, the air stream being so directed as to cool the filter. Another method for cooling the filter is to immerse the housing, enclosing the filter components, in liquid air. The filter unit passes desired wavelengths to suitable detecting devices such as bolometers, image scanning and converting systems.

The invention will be described in greater detail with reference to the accompanying drawing of which:

Similar reference characters are applied to similar elements throughout the drawing.

Figure 1:
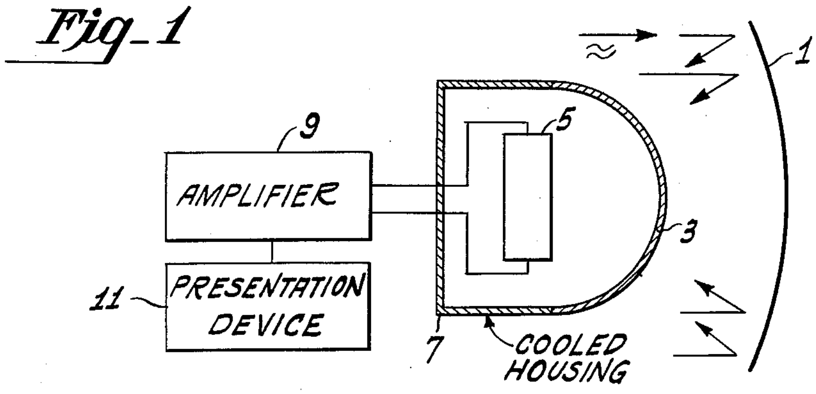
Fig. 1 is a schematic diagram of a first embodiment employing a bolometer at the focus of a pickup reflector.

In the first embodiment of the instant invention, shown in Fig. 1, infra-red radiation, constituting useful and ambient frequency energy, travels toward a parabolic reflector 1. The reflector 1 directs the infra-red energy through a cooled water-carbon dioxide filter unit 3 interposed between the parabolic reflector 1 and an infra-red sensitive cell or bolometer 5. The $CO_2$–$H_2O$ filter unit 3 absorbs the atmospheric ambient background frequency radiation and passes the useful signal frequency energy on to the infra-red sensitive cell 5. The housing 7 for the filter unit 3 supports the component filter elements and includes means for maintaining the filter components at desired low temperatures and desired pressures.

The housing 7 may be constructed entirely of a material permeable to infra-red energy, or it may be partly metallic with only the section exposed to infra-red energy comprising the substance permeable to infra-red wavelengths. Among the infra-red permeable materials suitable for the housing 7 are silver chloride, sodium chloride, calcium chloride, arsenic selenide, and germanium. The infra-red sensitive cell 5 provides an electric output proportional to the amount of infra-red energy focused on the cell 5. This output energy is amplified in an amplifier 9 and applied to a suitable indicating or presentation device 11.

Figures 2, 3:
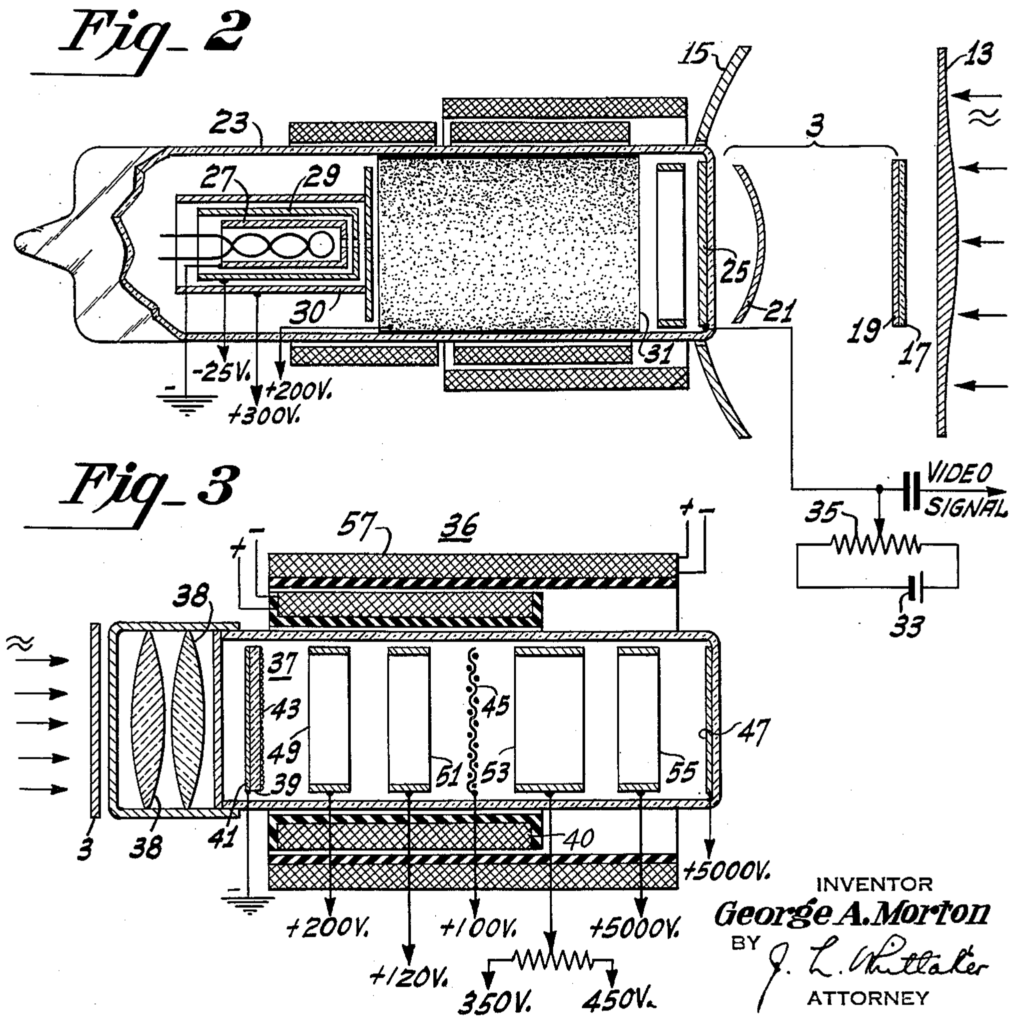
Fig. 2 is a schematic diagram of a second embodiment employing an image scanning tube for image presentation.
Fig. 3 is a schematic diagram of a third embodiment employing an infra-red image converter for viewing useful infra-red image radiation.

In a second embodiment of the invention shown in Fig. 2, employing the optical features of a Schmidt camera, and a scanning image device, the ambient and useful infra-red image waves pass through a corrector plate 13 of suitable shape for correcting for spherical aberration. The corrector plate 13, may, for example, be of sodium chloride or a thallium bromide-thallium chloride mixture. The infra-red wave energy passing through the corrector plate is reflected by a spherical mirror 15 and focused on a plane mirror 17. The surface of the plane mirror 17 facing the spherical mirror serves to support one component of the filter 19 (for example, frozen carbon dioxide). Part of the ambient radiation is absorbed by the carbon dioxide as the infra-red energy passes through the frozen carbon dioxide, is focused on the plane mirror 17 and is reflected by this mirror 17 through the remaining component 21 (water or ice) of the filter 3, where almost all of the remaining background radiation is absorbed.

The filtered infra-red image from the plane mirror 17 is reflected and focused on an infra-red sensitive photo-conductive target 25. The photo-conductive target 25 comprises a suitably activated mixture of PbS and PbO prepared in such a way as to provide high resistivity and a time constant sufficiently large to allow accumulation of a charge on the target 25 during an entire frame time. This is accomplished by evaporating PbO, at suitable conditions of temperature and pressure, and treating the PbO with sulphur to form a layer of microscopically thin, but microscopically differentiated, crystalline complexes of PbO, PbS, and $PbSO_4$. The infra-red image focused on the target 25 is scanned by an image scanning tube 23 as described in a copending application of Paul Kessler Weimer, Serial No. 78,687, filed February 28, 1949, now Patent 2,654,853. Either high or low velocity scanning may be used.

In operation, the cathode may be operated at ground potential and the control grid 29 may be operated at −25 volts. The accelerating electrode 30 surrounding the electron gun 27 may be connected to a source of 300 positive potential, while the focusing electrode 31, extending concentric with the path of the electron beam, may be connected to a source of 200 volt positive potential. Using low velocity scanning, a small positive voltage, of say 5 to 10 volts, is applied to the photo-conductive target 25 from some source of potential as a battery 33 and a slide wire 35. The operation of the tube 23 is as follows: Infra-red wave energy impinging on the photo-conductive target 25 increases the conductivity of the target 25 causing the surface of the target 25 gradually to charge positive. The scanning beam deposits electrons on the photoconductor 25 in proportion to the infra-red electrical image intensity, returning the scanned surface to zero potential. The electron beam returning from the target 25, modulated by the infra-red image energy appearing thereon, is applied to a video signal circuit preparatory for viewing on a conventional kinescope (not shown).

In the third embodiment of the invention shown in Fig. 3, using a velocity selector type image tube 36, the cooled infra-red filter 3 absorbs the ambient background infra-red wave energy passing through the filter and passes useful infra-red wave energy. The useful infra-red wave energy is focused by a pair of lenses 38 of the image tube 36 on an infra-red sensitive target 37. This target 37 comprises a resistance body 39, such as glass, coated on one side with a thin conducting coating 41 which is grounded, for example, to the negative terminal of the voltage supply. Small, discrete areas of emissive material 43 on the front surface of the target 37 constitute the picture elements capable of producing emission as desired. An exterior heating element 40 produces substantially uniform emission over the target 37. A control grid 45 interposed midway between the target 37 and the phosphor screen 47 may be adjusted to substantially cut off electron flow in the image tube 36. Thus infra-red wave energy impinging on the target 37, assuming the resistance body 39 has a positive coefficient of resistance, makes the target 37 more conductive and the emissive material 43 releases electrons. Between the grid 45 and the target 37 are placed ring electrostatic electrodes 49, 51. Between the grid 45 and the viewing screen 47 are placed two additional ring electrodes 53, 55. These ring electrodes are for accelerating the electrons toward the grid 45 and the fluorescent screen 47 respectively. Electrostatic focusing may be used but a coil 57 is used for producing electromagnetic focusing in a well-known way. A velocity selector type image tube as used is described more fully in a copending application of Gardner L. Krieger and George A. Morton, Serial No. 679,928, filed June 28, 1946, now U.S. Patent 2,572,494.

What I claim as my invention is:

1. An infra-red receiving system for receiving desired infra-red radiations originating at a remote point comprising, in combination, means spaced from said point for receiving said desired infra-red radiations and undesired infra-red radiations generated by predetermined infra-red emitting elements located between said point and said receiving means, an infra-red radiation filter comprising said same predetermined elements adjacent said receiving means for passing said desired infra-red radiations and rejecting said undesired infra-red radiations, and means coupled to said infra-red filter for utilizing only said desired infra-red radiations.

2. An infra-red receiving system according to claim 1 including means for cooling said filter to reduce ambient radiation therefrom.

3. An infra-red receiving system according to claim 2 wherein said filter material elements include carbon dioxide.

4. An infra-red receiving system according to claim 2 wherein said filter material elements include water.

5. In infra-red receiving system according to claim 1 wherein said filter material elements are in substantially transparent frozen form to reduce ambient radiation therefrom.

6. An infra-red receiving system for receiving desired infra-red radiations originating at a remote point comprising, in combination, means spaced from said point for receiving said desired infra-red radiations and undesired infra-red radiations generated by predetermined infra-red emitting elements located between said point and said receiving means, an infra-red radiation filter comprising said same predetermined elements adjacent said receiving means for passing said desired infra-red radiations and rejecting said undesired infra-red radiations, and means for coupling said infra-red radiation filter to an indicator whereby only said desired infra-red radiations are applied to said indicator.

7. An infra-red receiving system for receiving desired infra-red radiations originating at a remote point comprising, in combination, means spaced from said point for receiving said desired infra-red radiations and undesired infra-red radiations generated by elements of the earth's atmosphere, an infra-red radiation filter comprising said same elements of the earth's atmosphere adjacent said receiving means for passing said desired infra-red radiations and rejecting said undesired infra-red radiations, and means for coupling said infra-red radiation filter to an indicator whereby only said desired infra-red radiations are applied to said indicator.

8. In infra-red receiving system as claimed in claim 1 wherein said infra-red receiving means is directive.

9. An infra-red receiving system as claimed in claim 6 wherein said indicator comprises an infra-red imaging device having a photo-conductive cathode.

10. An infra-red receiving system as claimed in claim 6 wherein said indicator comprises an infra-red imaging device having a photo-emissive cathode.

11. An infra-red receiving system according to claim 1 wherein the elements of said filter comprise both carbon dioxide and water.

References Cited in the file of this patent

UNITED STATES PATENTS

| | | |
|---|---|---|
| 708,365 | Kliegl | Sept. 2, 1902 |
| 768,827 | Stewart | Aug. 30, 1904 |
| 1,758,088 | Schmick | May 13, 1930 |
| 1,862,622 | Hoffman | June 14, 1932 |
| 1,933,803 | Hickman | Nov. 7, 1933 |
| 2,109,235 | Kott | Feb. 22, 1938 |
| 2,189,320 | Morton | Feb. 6, 1940 |
| 2,212,211 | Pfund | Aug. 20, 1940 |
| 2,310,682 | Dooley | Feb. 9, 1943 |
| 2,372,661 | Dawson | Apr. 3, 1945 |
| 2,443,427 | Kidder et al. | June 15, 1948 |
| 2,541,374 | Morton | Feb. 13, 1951 |
| 2,543,369 | Kling | Feb. 27, 1951 |
| 2,547,173 | Rittner | Apr. 3, 1951 |
| 2,548,118 | Morton et al. | Apr. 10, 1951 |

OTHER REFERENCES

Introductions to Modern Physics, by Richtmyer and Kennard, fourth edition, published by McGraw-Hill Book Co., 1947, page 224.

Infra-Red Instrumentation and Techniques, by Williams, in Review of Scientific Instruments, vol. 19, No. 3, March 1948, pages 176–178.